Oct. 13, 1936.   W. J. BESLER   2,057,132
VEHICLE BRAKE AND CONTROL VALVE THEREFOR
Filed Jan. 26, 1933   2 Sheets—Sheet 1
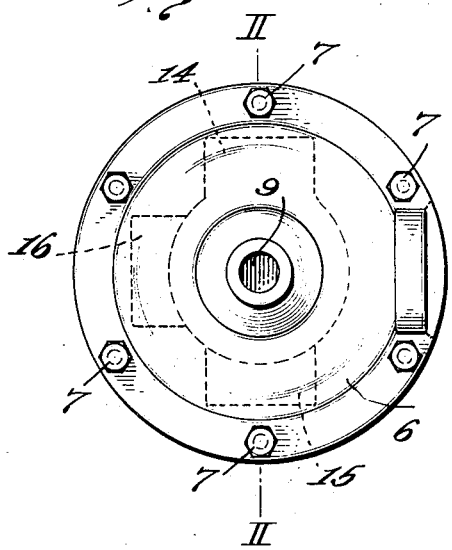
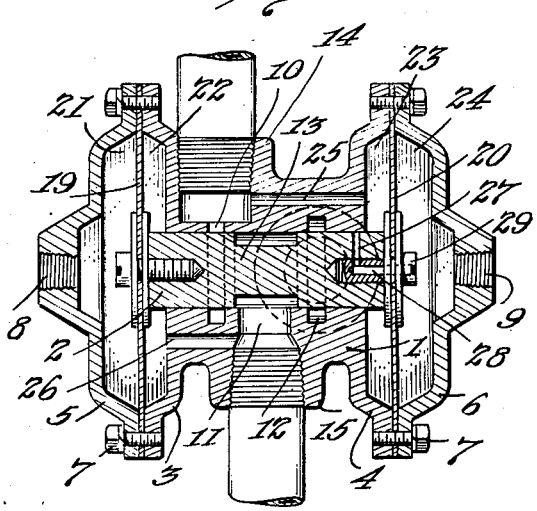
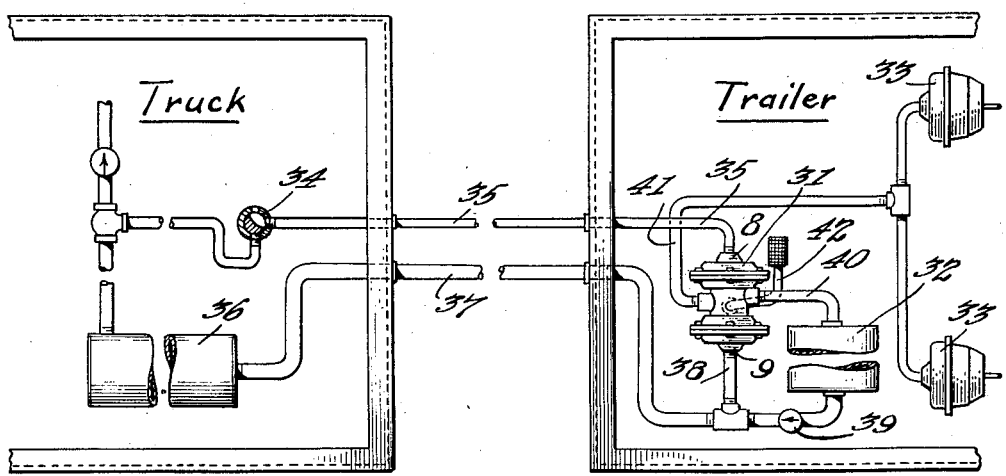
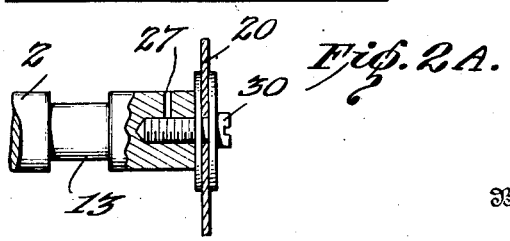
Inventor
William J. Besler
Lee B. Kenon
By   his Attorney

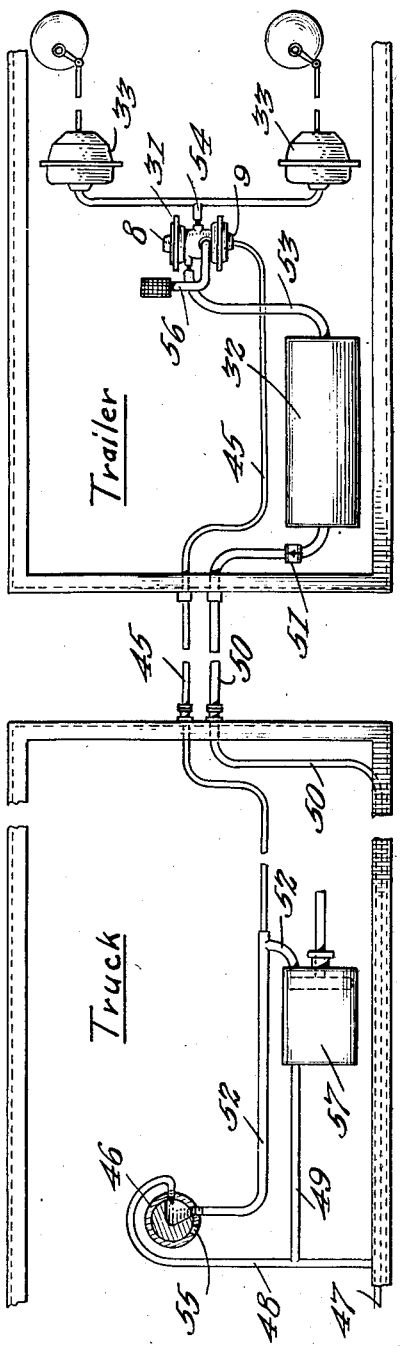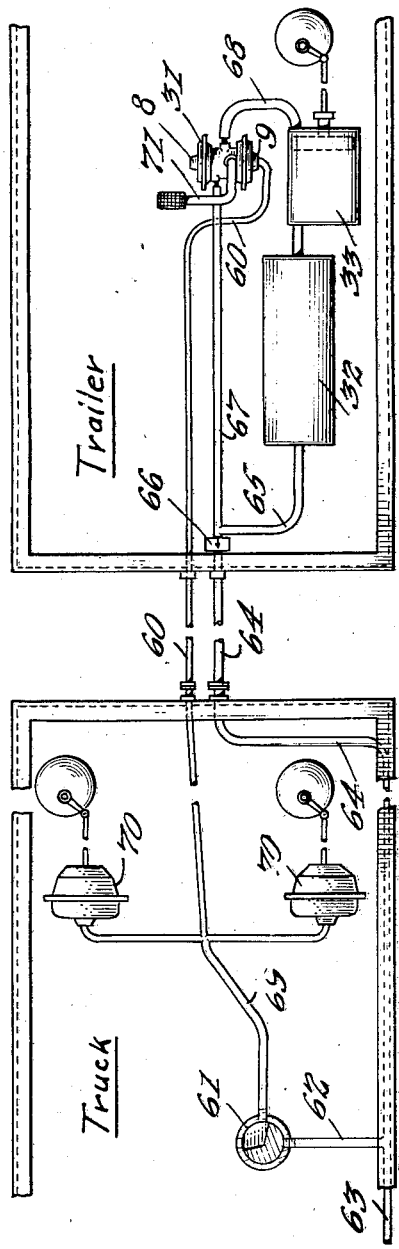

Patented Oct. 13, 1936

2,057,132

UNITED STATES PATENT OFFICE 2,057,132

VEHICLE BRAKE AND CONTROL VALVE THEREFOR

William J. Besler, Plainfield, N. J.

Application January 26, 1933, Serial No. 653,689

10 Claims. (Cl. 303—31)

This invention relates to fluid-pressure-operated braking equipments for automotive vehicles and to an improved control valve for use in such systems.

One object of the invention is to improve and simplify the control apparatus for equipments of the character indicated, particularly where the same are applied to multiple-unit vehicles, such as motor trucks provided with trailers.

Another object of the invention is to provide a control unit to correlate and balance the braking effort of a truck-trailer combination which may be readily adapted for use in connection with either an air-suspended brake motor on the truck and an air-suspended brake motor on the trailer or a vacuum-suspended brake motor on both the truck and trailer or an air-suspended motor on the truck and vacuum-suspended motor on the trailer or a vacuum-suspended motor on the truck and an air-suspended motor on the trailer.

A still further object of the invention is to provide an improved control or balanced relay valve for the trailer of a truck-trailer combination.

Other objects and advantages of the invention will appear from the following detailed description of an embodiment thereof which is shown on the accompanying drawings, wherein Fig. 1 is an end view of a preferred form of control or relay valve;

Fig. 2 is a sectional view of the valve taken on the line II—II of Fig. 1;

Fig. 2A is a detail view of a modification of the valve shown in Fig. 2;

Fig. 3 is a diagrammatic view of a control system for a truck-trailer combination utilizing the valve shown in Figs. 1 and 2; and Figs. 4 and 5 are similar views of other systems in which the valve shown in Figs. 1 and 2A is employed.

The valve shown in Figs. 1 and 2 comprises a casing 1 provided with a central longitudinal opening or aperture in which is disposed a reciprocable valve member or plunger 2. The casing 1 and plunger 2 are preferably of brass but may be made of any suitable non-corroding metal. The cross-section of the aperture in the casing is preferably circular. The plunger 2 fits snugly therein to provide a substantially fluid-tight relation and it is found that if the casing and plunger are made of brass, for example, this relation is maintained indefinitely under actual operating conditions without any lubrication between the engaging surfaces.

The casing 1 is further provided with enlarged bell-shaped end portions 3 and 4 which are closed by cap members 5 and 6, respectively. The cap members 5 and 6 are secured in assembled relation on the casing in any suitable manner, as by means of clamping bolts 7. The cap members 5 and 6 are provided with openings 8 and 9, respectively, which may be threaded to receive pipe connections, as desired.

The valve member or plunger 2 is shown in Fig. 2 in its central position. The displacement of the plunger 2 to either side of the central position is utilized to control the passage of fluid through the valve and for that purpose the casing 1 is provided with lateral port openings 10, 11, and 12, while the valve member 2 is provided with a central portion 13 of reduced cross-section so that the central port opening 11 is placed into communication with the port opening 10 upon displacement of the valve member 2 in one direction from its central position and with the port opening 12 upon displacement of the valve member 2 in the opposite direction. The casing 1 is further provided with angularly displaced threaded bosses 14, 15, and 16 opposite the respective port openings 10, 11, and 12 to receive the pipe connections to the valve.

The displacement of the valve member 2 is controlled in response to the relative values of four fluid pressures, to which the valve is subjected, in any desired manner. In the preferred construction shown in Figs. 1 and 2, flexible diaphragms 19 and 20 are secured to opposite ends of the valve member 2, the edges of the diaphragms being clamped between the end portions of the casing and the cap members 5 and 6. The diaphragms 19 and 20, which may be made of rubber reinforced with fabric, form with the end portions 3 and 4 of the casing and the cap members 5 and 6, four pressure chambers 21, 22, 23, and 24. The inner chamber 23 is connected at all times through an unobstructed passage 25 with the port opening 10. The inner chamber 22 is likewise connected at all times through an unobstructed passage 26 with the port opening 11. A small passage 27 is also provided in the valve member 2 in communication with a longitudinal passage 28 extending through the diaphragm 20 whereby the chambers 23 and 24 are placed in communication upon a slight displacement of said valve member to the right, as shown in Fig. 2, from its central position.

Instead of employing diaphragms as shown at 19 and 20, the end portions 3 and 4 of the casing might be cylindrical to cooperate with pistons formed on the ends of the valve member 2, the valve member being biased to the central position by suitable resilient means.

The above-described valve is adapted for use as a combined remote-control valve and emergency valve for truck-trailer combinations, as shown in Figs. 3-5. In Fig. 3, the valve is indicated at 31 and is connected to an auxiliary suction reservoir 32 and the brake motors or vacuum chambers 33 to apply and release the trailer brakes under the control of the operator's valve 34 located on the truck. The valve 34 is connected to the remote control or relay valve 31 through the control pipe or hose 35 communicating with the pressure chamber 21 of said relay valve. A suction reservoir 36 or other source of reduced pressure is connected with the operator's valve 34 and also through lines or hose connections 37 and 38 with the pressure chamber 24 of the valve 31 and with the auxiliary reservoir 32. A check valve 39 is connected in the line leading to the auxiliary reservoir 32 between said reservoir and the line 38 so that if the line 37 is ruptured, as by separation of the trailer from the truck, the reduced pressure in the auxiliary reservoir is maintained while air is admitted to the chamber 24 of the valve 31 through the line 38.

A pipe connection 40 connects the auxiliary reservoir 32 to the port 10 of the relay valve 31. Another pipe connection 41 connects the brake motors 33 to the port 11 of the relay valve 31. The port 12 of the relay valve is open to the atmosphere as indicated at 42, a screen or dust guard being preferably provided for this port as indicated.

In this modification, the brake motors 33 on the trailer are of the vacuum-chamber or air-suspended type, normally containing air and being energized by exhausting this air into the auxiliary suction reservoir 32. Under normal conditions, when the brakes are released, the pressure chamber 21 contains air at atmospheric pressure admitted through the valve 34. The valve 34 may be an ordinary three-way valve similar to that shown, or of the type shown in my prior Patent No. 1,673,177, dated June 12, 1928, and may be arranged to control the brakes on the truck (not shown) as in the system shown in said patent. The pressure chamber 22 contains air at atmospheric pressure by reason of the passage 26 through which said chamber is connected with the pipe connection 41. The pressure chambers 23 and 24 are partially evacuated by reason of the connections of these chambers through the pipe connections 37, 38, and 40 to the reservoirs 36 and 32, respectively.

It will be noted however that the effective area of the left-hand side of the diaphragm 20 (see Fig. 2) is less than that of the right-hand side of said diaphragm by reason of the valve plunger or piston 2 secured thereto; thus, although the pressures in the chambers 23 and 24 are equal under the described conditions, the forces acting on the diaphragm 20 are unbalanced and the diaphragm and plunger 13 are displaced to the right by the air pressure in the chamber 21. Therefore the brake motors 33 are connected through the pipe connection 41 and ports 11 and 12 to the air inlet 42. In addition, the pressure chambers 23 and 24 are interconnected through the restricted passages 27 and 28 which are of sufficient area to permit gradual equalization of the pressures in said chambers if any difference exists such as might be caused under certain conditions, as for example, if a small leak existed in the hose connection 37.

To apply the brakes on the trailer, the control valve 34 on the truck is operated to connect the reservoir 36 to the control line 35 to partially reduce the pressure in said line, the degree of application of the brakes depending upon the extent to which the pressure is reduced in the control line by reason of the pressure-balancing characteristics of the relay valve 31. The control line 35 is connected to the pressure chamber 21 and consequently the reduction in pressure results in a displacement of the valve member 2 to the left (Fig. 2) until the port 12 is lapped and ports 10 and 11 are placed in communication. The connection of the auxiliary reservoir 32 through the pipe connections 40 and 41 and ports 10 and 11 to the brake motors 33 causes the brakes to be applied. If the reduction of the pressure in the control line 35 is comparatively small, a partial reduction of the pressure in the line 41 will equalize the pressures in the pressure chambers 21 and 22 by reason of the passage 26. Thereupon the valve member 2 will be displaced to the right sufficiently to seal the port 10 and the brakes are only energized to an extent corresponding to the reduction in pressure in the control line 35. To release the brakes, air is admitted by the valve 34 to the control line 35, and the increase in pressure in the pressure chamber 21 of the valve 31 relative to that in the pressure chamber 22 causes such a displacement of the valve member 2 as to connect the ports 11 and 12 and admit air through the air inlet 42 to the pipe connection 41 leading to the brake motors 33. As will be apparent, the extent of the release of the brakes is dependent upon the degree to which the pressure in the control line 35 approaches atmospheric pressure.

The relay valve 31 also acts as an emergency valve to apply the trailer brakes automatically if the trailer breaks loose from the truck. Upon the rupture of the hose connections 35 and 37, air is admitted to the pressure chambers 21 and 24 but the auxiliary reservoir 32 is sealed by the check valve 39. Since the pressure chamber 22 is filled with air and the pressure chamber 23 is partially evacuated, the valve member 2 is displaced to the left, port 27 is sealed (Fig. 2) and the ports 10 and 11 are interconnected. The auxiliary reservoir 32 exhausts the brake motors 33 and the brakes are automatically applied.

The valve 31 is not restricted in its application to installations in which the truck and trailer are equipped with brake motors of the air-suspended type, but is of the universal type; i. e., it is equally applicable to installations wherein the truck is equipped with a vacuum-suspended brake motor and the trailer with an air-suspended brake motor or vice versa. The application of the valve 31 to such systems is illustrated in Figs. 4 and 5, respectively.

As shown in Fig. 4, where the trailer is equipped with brake motors of the air-suspended type and the truck with a brake motor of the vacuum-suspended type, the system includes a valve 31, auxiliary suction reservoir 32 and brake motors 33 as in the system shown in Fig. 3. In this case, however, the pressure chamber 24 of the valve 31 is connected by a pipe connection 45 with a main control valve 46 on the truck to provide remote control of the relay valve in accordance with the operation of said main control valve. The valve 46 is connected through pipe connections 47 and 48 to a source of sub-atmospheric pressure (not shown), such as the intake manifold of the internal combustion engine on the truck. The truck brake motor 57, of the vacuum-suspended type, is also connected to said source through the pipe connection 49. The arrangement of a brake motor of this type is well known and in common use, and further description thereof is deemed unnecessary.

A pipe connection 50 from the source of reduced pressure is provided to exhaust the auxiliary reservoir 32 on the trailer, a check valve 51 adjacent said reservoir being provided in this line. A pipe connection 52 normally connects the vacuum-suspended truck motor 57 to vacuum through the main control valve 46, shown in Fig. 4 in the release position. A pipe connection 53 connects the auxiliary reservoir 32 on the trailer to the relay valve 31 but in this case, since the trailer motors 33 are of the air-suspended type, the valve 31 only connects the fluid-pressure source represented by the reservoir 32 to the motors 33 through the pipe connection 54 when it is desired to apply the brakes; at this time, the vacuum-suspended motor on the truck is energized by admitting air through the port opening 55 of the main control valve 46 to the pipe connections 52 and 45.

The actuation of the control valve 46 as described to apply the brakes admits air through the pipe connection 45 to the pressure chamber 24 of the relay valve 31. Prior to this admission of air, the valve member 2 is substantially in released position, since the pressure chambers 21 and 22 contain air at atmospheric pressure and the chambers 23 and 24 are partially evacuated to a substantially equal extent and the area of the pressure chamber 24 is larger than the area of the pressure chamber 23, the chamber 23 being connected by the passage 25 and pipe connection 53 to the suction reservoir 32. When the pressure in the valve chamber 24 rises, the valve member 2 is moved to place the ports 10 and 11 in communication, thereby connecting the brake motors 33 to the reservoir 32.

The passage 26 in the valve provides for a reduction in pressure in the pressure chamber 22 to restore the valve member 2 to normal or balanced position, so that the degree of energization of the brake motors 33 depends upon the extent to which the air pressure in the control line 45 has been raised under the control of the operator. It will be apparent that the valve 31 functions to control the trailer brakes in the same manner as in the system shown in Fig. 3, although it responds to an increase instead of a decrease in pressure in the control line to energize the brake motors and to a decrease instead of an increase in said pressure to release the same by admitting air through the line 56. The operation as an emergency valve will be obvious as an accidental rupture of the control line 45 admits air to said line to apply the brakes as described above.

In "full-on" position the braking effort in the chambers 33 is not reduced by the amount of initial pressure differential represented by the differential in areas of chambers 23 and 24, as under this condition, the pressure in chamber 22 balances that in chamber 23 which is of identical area.

The valve 31 in this instance, although connected to the control line, reservoir and brake motors in a different manner, is of the same construction as described above in connection with Figs. 1-3 except that a solid screw 30 as shown in Fig. 2A is provided to clamp the diaphragm 20 to the valve member 2 instead of a hollow screw having the passage 28 therein.

In Fig. 5, the same valve 31 is utilized to control a brake motor 33 of the vacuum-suspended type on the trailer by admitting air thereto to apply the brakes, the motor 33 being normally connected as shown to an auxiliary suction reservoir 32. In this instance, the control line 60 extending from the valve 31 to the main control valve 61 or to a separate control valve (not shown) if desired, on the truck normally contains air at atmospheric pressure. The valve 61 is connected by pipe connections 62 and 63 to a suitable source of sub-atmospheric pressure (not shown) and the auxiliary reservoir 32 is also connected to said source through the pipe connections 64 and 65. A check valve 66 is preferably provided in the line 64 adjacent the line 65 extending to the auxiliary reservoir 32, as shown.

Pipe connections 67 and 68 connect the ports 10 and 11 of the valve 31 to the source of operating pressure and the cylinder of the brake motor 33, respectively. A pipe connection 69 connects the control valve 61 on the truck to the control line 60 and the air-suspended brake motors 70 for the truck. The valve 61 is shown in Fig. 5 in the release position in which air is admitted to the brake motors 70 and the control line 60.

When the valve 61 is actuated to apply the brakes, the pipe connection 69 is connected to the source of suction to exhaust the brake motors 70 on the truck and to reduce the pressure in the control line 60 and the pressure chamber 24 connected thereto. Normally the valve member 2 of the valve 31 is balanced because the pressure chambers 21 and 24 contain air at atmospheric pressure and the pressure chambers 22 and 23 by reason of their connection with the ports 11 and 10 are partially exhausted to a substantially equal extent. The reduction of pressure in the control line 60 and pressure chamber 24 causes the valve member 2 to move to the right as shown in Fig. 2 and interconnect the ports 11 and 12, thereby admitting air through the inlet pipe 71 and line 68 to the cylinder of the trailer motor 33 to apply the trailer brakes. Since the port 11 to which the line 68 is connected is in communication with the pressure chamber 22, the increase of pressure in said line restores the valve member 2 to normal when the pressures in chambers 22 and 24 are substantially inversely proportional, so that an application of the brakes is obtained which is proportional to the extent of the reduction of pressure in the control line 60. When the main control valve 61 is actuated to admit air to the line 69 to release the brakes, the increase in pressure in the pressure chamber 24 moves the valve 2 to the left as shown in Fig. 2 and places the ports 10 and 11 in communication thereby exhausting the cylinder of the brake motor 33 through the lines 68, 67, 64, and 63.

It will thus be apparent that the simple and rugged control valve described has universal application to the different types of truck-trailer braking systems. The invention is not limited to the details of construction or to the systems shown and described above, but includes modifications and equivalent structures coming within the scope of the appended claims.

I claim:

1. A valve of the character described for correlating the operation of vacuum brakes comprising a casing provided with lateral port openings and a central longitudinal aperture of uniform cross-section from end to end of the casing, a movable plunger adapted to reciprocate in said longitudinal aperture and to interconnect said port openings, an inner and an outer pressure chamber at one end of said casing, means for controlling the movement of said plunger in accordance with the difference between the pressures in said chambers, an inner and an outer pressure chamber at the other end of the casing, means of substantially equal proportions and effectiveness to said first-named means for controlling the movement of said plunger in accordance with the difference between the pressures in said last-mentioned chambers, said first and second named means exerting equal forces on said plunger when the pressure differential existing between one set of inner and outer chambers is equal to the pressure differential existing between the other set of inner and outer chambers thereby positioning said plunger to seal said lateral port openings, and means whereby each of said inner chambers is connected with one of said port openings irrespective of the position of said plunger.

2. A valve of the character described for correlating the operation of vacuum brakes comprising a casing provided with three lateral port openings and a central longitudinal aperture of uniform cross-section from end to end of the casing, a movable plunger adapted to reciprocate in said longitudinal aperture and to interconnect two of said port openings in one position thereof while maintaining the third port opening sealed and to interconnect said third port opening with one of the other port openings in another position thereof, two flexible diaphragms each secured to one end of said movable plunger, the area of one of said diaphragms being substantially equal to the other diaphragm, and means defining inner and outer pressure chambers on opposite sides of each of said diaphragms, said casing being provided with two passages extending from two of said port openings to said inner pressure chambers, respectively, said diaphragms exerting equal forces on said plunger when the pressure differential existing between one set of inner and outer chambers is equal to the pressure differential existing between the other set of inner and outer chambers thereby positioning said plunger to seal said lateral port openings.

3. A valve of the character described for correlating the operation of vacuum brakes comprising a casing provided with three longitudinally spaced port openings and a central longitudinal aperture of uniform cross-section from end to end of the casing, a movable cylindrical plunger therein of the same diameter as that of said aperture, said plunger having a portion of reduced cross-section of such extent as to register with and interconnect different pairs of said port openings in different positions thereof with respect to the casing, and pressure-responsive means of substantially equal area at both ends of said plunger for controlling the position thereof in said aperture, said pressure-responsive means comprising a flexible diaphragm secured to each end of said plunger and means cooperating therewith to form opposed pressure chambers on opposite sides of each of the diaphragms, said diaphragms exerting equal forces on said plunger when the pressure differential existing between one set of said opposed chambers is equal to the pressure differential existing between the other set of opposed chambers thereby positioning said plunger to seal said spaced port openings.

4. A valve of the character described for correlating the operation of vacuum brakes comprising a casing provided with three longitudinally spaced port openings, a central longitudinal aperture extending through the casing and flaring end portions concentric with said longitudinal aperture, a movable plunger therein and of the same diameter as that of said aperture, said plunger having a portion of reduced cross-section of such extent as to register with and interconnect different pairs of said port openings in different positions thereof with respect to said casing, hollow cap members on said flaring end portions of the casing and flexible diaphragms of substantially equal areas secured to the ends of said movable plunger and interposed between said cap members and the end portions of said casing to form inner and outer pressure chambers at each end of the plunger, said inner pressure chambers being sealed from each other when the plunger is in the normal position in which said port openings are sealed, said diaphragms exerting equal forces on said plunger when the pressure differential existing between one set of inner and outer chambers is equal to the pressure differential existing between the other set of inner and outer chambers thereby positioning said plunger to seal said spaced port openings.

5. A valve of the character described for correlating the operation of vacuum brakes comprising a casing provided with three longitudinally spaced port openings, a central longitudinal aperture extending through the casing and flaring end portions concentric with said longitudinal aperture, a movable plunger adapted to reciprocate in said longitudinal aperture, said plunger having a portion of reduced cross-section of such extent as to register with and interconnect different pairs of said port openings in different positions thereof with respect to said casing, hollow cap members on said flaring end portions of the casing and flexible diaphragms of substantially equal areas secured to the ends of said movable plunger and interposed between said cap members and the end portions of said casing to form inner and outer pressure chambers at each end of the plunger, said diaphragms exerting equal forces on said plunger when the pressure differential existing between one set of inner and outer chambers is equal to the pressure differential existing between the other set of inner and outer chambers thereby positioning said plunger to seal said spaced port openings, said casing being provided with independent passages directly connecting two of said port openings with said inner pressure chambers.

6. A valve of the character described comprising a casing provided with three lateral port openings and a longitudinal aperture extending through the central portion of the casing, a movable plunger adapted to reciprocate in said longitudinal aperture and having portions cooperating with said lateral port openings to control the same in accordance with the relative positions of said plunger and casing, flexible diaphragms of substantially equal areas secured to the ends of said movable plunger and means cooperating with said diaphragms to form pressure chambers on opposite sides of each diaphragm, said plunger being provided with a restricted passage connecting the pressure chambers at one end thereof.

7. A valve of the character described comprising a casing provided with three lateral port openings and a longitudinal aperture extending through the central portion of the casing, a movable plunger adapted to reciprocate in said longitudinal aperture and having portions cooperating with said lateral port openings to control the same in accordance with the relative positions of said plunger and casing, flexible diaphragms of substantially equal areas secured to the ends of said movable plunger and means cooperating with said diaphragms to form pressure chambers on opposite sides of each diaphragm, said plunger being provided with a passage connecting the pressure chambers at one end thereof which is sealed when the plunger occupies a predetermined position with respect to the casing.

8. In combination with a truck and trailer each provided with a servo-motor brake of the fluid-pressure vacuum operated type, a source of vacuum, a main control valve on the truck, means including said valve for controlling the servo-motor brake on the truck, a relay valve on the trailer directly connected to said main control valve and means including said relay valve for controlling the servo-motor brake on the trailer, said relay valve comprising a casing provided with valve ports connected to the servo-motor brake on the trailer, to atmosphere and to said source of vacuum, respectively, a valve member in said casing adapted to cooperate with said ports and pressure-responsive means for actuating said valve member in accordance with the relative values of four pressures, of which one corresponds to the adjustment of said main control valve, another to the pressure in the valve port connected to said trailer servo-motor and another to the pressure of the source of vacuum.

9. In combination with a truck and trailer each provided with a servo-motor brake of the fluid-pressure vacuum operated type, a source of vacuum, a main control valve on the truck, means including said valve for controlling the servo-motor brake on the truck, a relay valve on the trailer, a control line for directly connecting said relay valve to said main control valve, means including said relay valve and a line connecting the same to the servo-motor brake on the trailer for controlling said trailer brake, said relay valve comprising a casing provided with valve ports connected to the servo-motor brake on the trailer, to atmosphere and to said source of vacuum, respectively, a valve member in said casing adapted to cooperate with said ports and pressure-responsive means for positioning said valve member to interconnect said port connected to the servo-motor on the trailer alternatively with either of said other ports in accordance with the relative values of four pressures of which one corresponds to the pressure in the control line from the main control valve to the relay valve, another to the pressure in the line connecting the relay valve to the servo-motor brake on the trailer and another to the pressure of said source of vacuum.

10. In combination, a universal control valve for the trailer of a truck-trailer fluid pressure braking equipment, a source of fluid pressure, a brake on said trailer, a servo-motor for operating said brake in accordance with the adjustment of said valve, a main control valve on the truck to operate the brake by said servo-motor, a control pressure line extending directly from said control valve on the truck to said valve on the trailer, said universal control valve having a plurality of ports and a movable element for interconnecting and closing said ports in response to variations in pressure in said control line, in said servo-motor and in said source to energize the servo-motor to apply the brake upon either a decrease or an increase in the pressure in said control line depending upon the connection of said valve in the system.

WILLIAM J. BESLER.